United States Patent Office

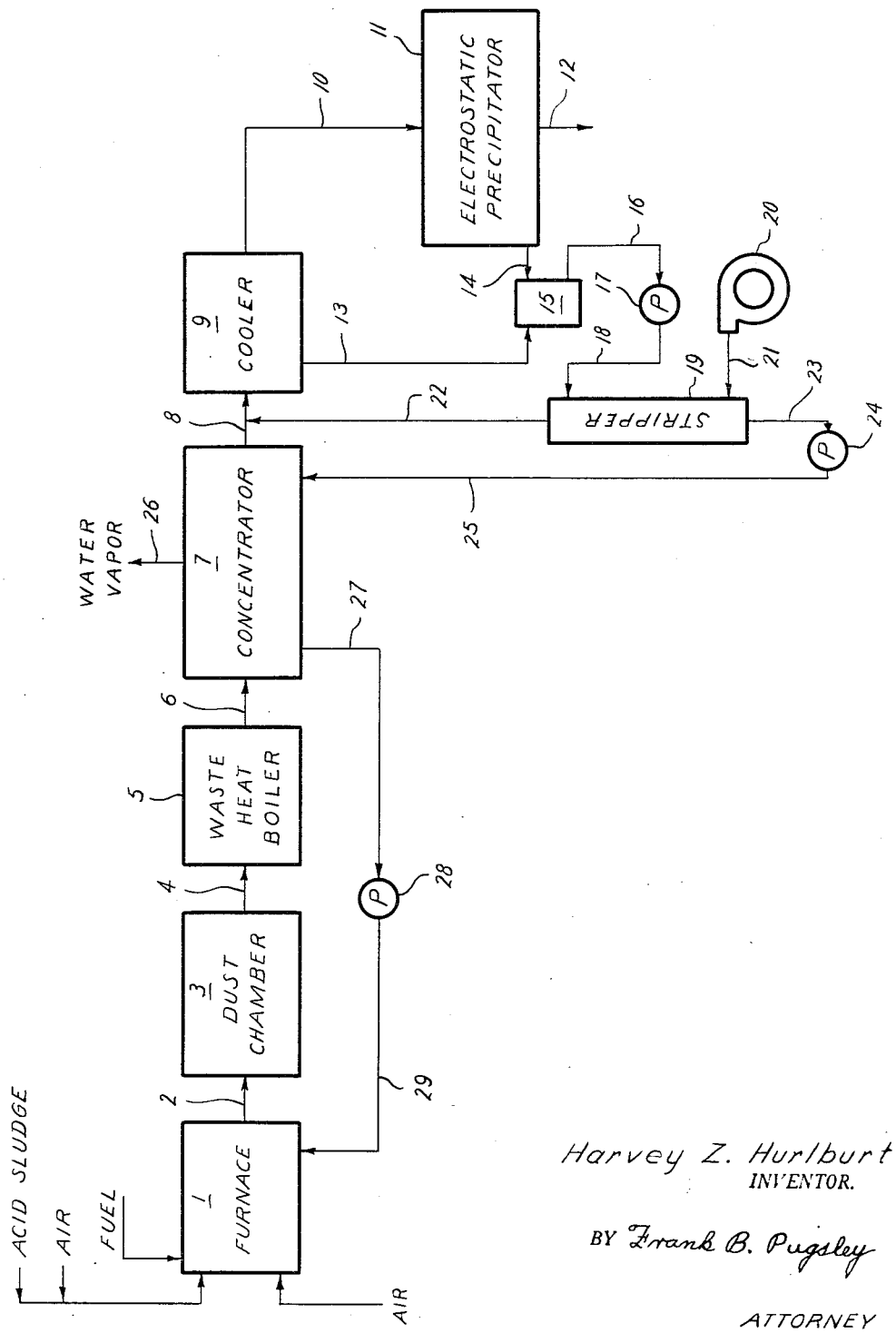

2,789,035
Patented Apr. 16, 1957

2,789,035

PROCESS FOR THE PRODUCTION OF SULFUR DIOXIDE FROM PETROLEUM ACID SLUDGE

Harvey Z. Hurlburt, Houston, Tex., assignor to Stauffer Chemical Company, Houston, Tex., a corporation of Delaware Application October 25, 1954, Serial No. 464,422

9 Claims. (Cl. 23—177)

This invention relates to an improved process for the production of sulfur dioxide from sulfuric acid sludges, and more particularly to an improved process involving recirculation of weak acid for the processing of petroleum refinery sludges with relatively low acid content.

Typical methods for the production of sulfur dioxide from acid sludges disclose procedures which essentially comprise steps in which the acid sludge is burned in a furnace and the resulting sulfur dioxide purified according to conventional methods. Such processes have been successfully reduced to practice for the regeneration of acid sludges containing more than 80% sulfuric acid. The acid sludges produced by refinery operations such as, for example, lubricating oil treatment, many contain considerably less than 80% sulfuric acid, and the content of carbonaceous material (containing free carbon and hydrocarbons) in these sludges may be as high as 20–40% by weight. Such sludges are not amenable to regeneration by these continuous methods, unless the improvements to be disclosed herein are adopted. It has been found that low-acid, high-carbon sludges give rise to extremely high temperatures in the combustion chamber when regenerated according to conventional methods because of the heating value of the relatively high hydrocarbon content so that the temperatures encountered in the regeneration furnace may be as high as 3,000 deg. F. Since this is somewhat higher than the temperatures for which present day furnaces are designed, operation at this temperature level would be harmful to the combustion chamber.

Furthermore, even in the regeneration of high-acid sludges, large amounts of water vapor are formed in the combustion from the decomposition of the sulfuric acid and the combustion of the hydrogen which is chemically combined in the carbonaceous portion of the sludge. The free water present in the original sludge also contributes to the total water vapor in the combustion gases, as does the combustion of the combined hydrogen in the fuel gas or fuel oil burned with the sludge. The major part of this water vapor must be removed from the process since more water is present than is desired in the product. The excess water is generally removed by cooling the gas stream with water, either directly, by a water or weak acid spray, or indirectly, as with a cooler or condenser in which the cooling medium does not come into direct contact with the gases. In either case, the water leaving the system, arising from the excess water vapor in the combustion gases, contains sulfuric acid formed from small quantities of sulfur trioxide in the combustion gases which combine with the condensate water to form sulfuric acid. This acid and the dissolved sulfur dioxide create a serious disposal problem often requiring expensive neutralization processes to comply with legal requirements regarding pollution of waters and the like.

There are two methods currently in use to dispose of the high-carbon, low-acid sludges. First, the sludge may be hydrolyzed to produce a weak acid fraction and a heavy tar-like mass, the latter containing most of the carbonaceous material in the original sludge and also containing some entrapped weak acid. The weak acid fraction is concentrated by heat for re-use. The tar-like mass is dispersed in fuel oil and may be disposed of by burning in conjunction with a steam boiler. Second, if the sludge is not amenable to treatment by hydrolysis, or if the facilities for this treatment are not available, the acid sludge may be burned directly with or without a mixture of fuel oil, depending on its fuel value. Neither of these methods is entirely satisfactory. Although the hydrolyses of acid sludges permits recovery of much of the sulfur value of the original sludge, much is lost to the atmosphere and to the sewer, and the recovered acid still contains sufficient carbonaceous material to discolor it. The second method recovers none of the sulfur value of the sludge, virtually all of the sulfur compounds passing into the atmosphere with the furnace exit gases.

It is an object of my invention to provide an improved method for the regeneration of low-acid, high-carbon sludges. It is another object of my invention to provide a sludge processing method which will increase the recovery of sulfur content. A further object of my invention is to provide a sludge processing technique which eliminates the problem of disposal of the acid-tainted water stream produced by the practice of existing processes. Other objects and advantages of my invention will appear in the following specification and appended claims.

By my improvement it is discovered that in burning low-acid, high-carbon sludges to produce sulfur dioxide, the furnace temperature may be effectively controlled by an internal processing cycle whereby the acid-tainted waters condensed during the cooling and purifying of the produced sulfur dioxide are returned to the furnace. The rate of flow of this internal cycle of water containing dissolved sulfur dioxide and sulfuric acid may be varied as needed to control the furnace temperature.

The principles of my invention may best be explained by reference to the attached drawing which is a schematic diagram representing a typical embodiment of my invention. Acid sludge of the low-acid, high-carbon type is atomized with air and the carbonaceous content thereof burned in the combustion chamber of the furnace 1 until substantially all hydrogen, carbon and sulfur components contained in said sludge are burned to water vapor, carbon dioxide, sulfur dioxide and sulfur trioxide. Sufficient combustion air is admitted at the furnace to provide excess oxygen in amounts such that from 1–3% oxygen by volume will be present in the furnace exit gases. The gases, containing sulfur dioxide, are about 2000–2300 deg. F. when they leave the furnace. These gases are passed through conduit 2 to a dust chamber 3, where the bulk of the finely divided ash in the furnace gas is permitted to settle out. Then the gas mixture passes through line 4 to a suitable cooler such as a waste heat boiler 5, where they are cooled to about 700–1000 deg. F. and the heat content of the gases may be utilized to produce steam in the boiler drum. The gases are then passed through line 6 to the tubes of an acid concentrator 7, consisting of a shell and tube type heat exchanger which further cools the combustion gases to about 400–500 deg. F. by heat exchange with dilute acid liquor as hereinafter described. The gases leaving the acid concentrator are conveyed by the gas conduit 8 to the indirect cooler 9 where they are cooled to about 80–130 deg. F. resulting in condensation of water which is removed from the gas stream. The exact temperature of the gases at this point is determined by the amount of water vapor desired in the exit gases.

In order to remove sulfuric acid mist from the cooled gases, they are passed through line 10 to an electrostatic precipitator 11 which removes sulfuric acid mist; thereafter they pass through the conduit 12 which conveys them from this process to further processing where they may be used as the basic material for the production of sulfuric acid or any other desired use. The acid drips from the electrostatic precipitator 11 are conveyed by line 14 to holding tank 15; also, the water previously removed from the gases in the cooler 9 is conveyed through pipe 13 to a holding tank 15. The water in the holding tank, containing some sulfuric acid and dissolved sulfur dioxide, is passed through line 16 to pump 17 which propels it through line 18 to the top of the stripper 19 which may be a conventional packed column, a gas (which may be air) is forced by blower 20 through conduit 21 which conveys the gas into the bottom of the stripper 19. This gas is caused to pass upward through the stripper contacting the water passing down the stripper. The dissolved sulfur dioxide is substantially removed by this gas or air. The liquid stream may be heated prior to stripping to improve the stripping efficiency in an alternative embodiment of my invention. The gas or air, sulfur dioxide and water vapor leaving the top of the stripper may be advantageously introduced into the system as shown in the drawing by using the conduit 22 which conveys the gas into the conduit 8. In this way pollution of the atmosphere and loss of sulphur dioxide is avoided. The liquor leaving the bottom of the stripper will contain approximately 5–10% sulfuric acid. This stripped liquor passes by line 23 to pump 24 which forces it through line 25 to the shell side of the concentrator 7 where the heat in the process gases is used to evaporate water from the weak acid and thus concentrate it. The water vapor thus removed from the weak acid is expelled through line 26. The amount of water to be expelled at this point may be readily calculated as being the difference between the total amount of water in the furnace exit gases and the amount of water desired in the exit gases leaving through conduit 12. The gases leaving through conduit 12 may be used for the manufacture of sulfuric acid by the conventional processes. Also, the amount of water expelled from the weak acid in the concentrator will determine the strength of the acid leaving the concentrator for a specific acid input rate. The concentrated acid leaving the concentrator is conveyed by line 27 to pump 28 which pumps it through line 29 into the combustion furnace 1.

The introduction of this acid stream into the furnace serves a two-fold purpose. First, it provides a means of disposal of this acid stream, which may contain 20–60% sulfuric acid, and, second, it permits control of the furnace temperature since the material is strongly heat absorbent. A relevant aspect of this invention is the fact that the rate of concentrated acid introduced into the furnace can be regulated at will so that good control of the furnace temperature is possible. Thus, the weak acid drips from the cooler 9 and electrostatic precipitator 11, together with the concentrated acid constitute an internal cycle, and the rate of circulation of this cycle can be varied at will.

Theoretically, the typical low-acid, high-carbon sludge acid requires no additional fuel for regeneration. However, it is often desirable to burn a small amount of fuel gas or fuel oil in the furnace to initiate combustion of the acid sludge and to control the position of the combustion zone in the furnace. Therefore, the drawing shows fuel entering the furnace. Use or non-use of fuel at this point does not vitiate the practice of the present invention.

It is also recognized that the method shown in the attached sketch while illustrative of a typical process, is representation only and may be varied in its design details without departing from the principle of the present invention. By way of illustration, without limiting the foregoing, the necessary removal of water vapor from the system may be achieved by any method employing heat from any source and air or gas may be employed to assist in the process of concentrating the dilute acid, without departing from the present invention. Moreover, removal of water from the system could be accomplished by draining a portion of weak acid drips to the sewer and recycling the remainder if disposal means are available for this portion of the weak acid. I therefore intend, by the appended claims to cover all such modifications as come within the true spirit and scope of my invention.

What I claim as new and desire to secure by Letters Patent of the United States is:

1. A continuous process for converting sulfuric acid sludges containing at least 20% hydrocarbonaceous material comprising the steps of: spraying the sludge into a combustion chamber; burning the hydrocarbonaceous material with excess oxygen until substantially all hydrogen, carbon and sulfur compounds are burned to water vapor, carbon dioxide, sulfur dioxide and sulfur trioxide; cooling the combustion gases to condense water vapor; electrostatically precipitating the sulfuric acid mist from the cooled combustion gases; mixing the condensate and precipitate to form a dilute acid liquor; stripping said liquor of dissolved sulfur dioxide by contact with air and introducing the sulfur dioxide and air mixture leaving the stripper into the flow of combustion gases; concentrating the stripped liquor by heating with combustion gases to evaporate water, and spraying the resulting concentrated condensate into the combustion chamber.

2. A process for converting acid sludges containing carbonaceous material, sulfuric acid and sulfur compounds by burning said acid sludges in a combustion chamber; conveying the combustion gases to a cooler where a part of the water vapor is condensed; evaporating water from the condensate; and conveying the resulting concentrated condensate into the combustion chamber.

3. A continuous process for converting sulfuric acid sludges having substantial amounts of hydrocarbonaceous material, comprising continuous introduction and burning of sludge in a combustion chamber, cooling the combustion gases, concentrating the resulting condensate by evaporation, and conveying the concentrated condensate back into said combustion chamber.

4. A process for converting sulfuric acid sludges containing hydrocarbonaceous material by: spraying the sludge into the combustion chamber of a furnace; burning said hydrocarbonaceous material with a suitable fuel and with excess air until substantially all hydrogen, carbon and sulfur compounds are burned to water, carbon dioxide, sulfur dioxide and sulfur trioxide; cooling the combustion gases from the furnace whereby a part of the water vapor is condensed; stripping the resulting condensate of dissolved sulfur dioxide by contact with air; returning the removed sulfur dioxide to the furnace gases; and conveying a portion of the condensate to the combustion chamber of the furnace.

5. A process for converting sulfuric acid sludges containing hydrocarbonaceous material, comprising the following steps: spraying the sludge into the combustion chamber of a furnace; burning said hydrocarbonaceous material with a suitable fuel and with excess air until substantially all hydrogen, carbon and sulfur compounds are burned to water, carbon dioxide, sulfur dioxide and sulfur trioxide; cooling the combustion gases from the combustion chamber whereby a part of the water vapor is condensed; stripping dissolved sulfur dioxide from the condensate, concentrating the condensate water from the stripper in a heat exchanger employing waste heat from the combustion gases to evaporate water from the condensate; and conveying the concentrated condensate from the concentrator to the combustion chamber of said furnace.

6. A process for converting sulfuric acid sludges containing hydrocarbonaceous material comprising the steps of: burning the sludge in the combustion chamber of a furnace with excess air until substantially all hydrogen, carbon and sulfur compounds are burned to water, carbon dioxide, sulfur dioxide and sulfur trioxide; cooling the combustion gases from the furnace whereby the water content is reduced by condensation; stripping dissolved sulfur dioxide from said condensate; and conveying a portion of the condensate to the combustion chamber of said furnace.

7. A process for converting acid sludges containing carbonaceous material, sulfuric acid and sulfur compounds comprising the steps of: burning said acid sludges in a combustion chamber; conveying the combustion gases to a cooler where a part of the water vapor is condensed; evaporating water from the condensate produced by said cooler; and maintaining the temperature of said combustion chamber at a predetermined level by conveying the resulting concentrated condensate into the combustion chamber.

8. A process for converting sulfuric acid sludges containing hydrocarbonaceous material comprising the steps of: burning the sludge in the combustion chamber of a furnace with excess air until substantially all hydrogen, carbon and sulfur compounds are burned to water, carbon dioxide, sulfur dioxide and sulfur trioxide; cooling the combustion gases from the furnace whereby the water content is reduced by condensation; stripping the dissolved sulfur dioxide from the condensate produced by said cooling; and maintaining the temperature of said combustion chamber at a predetermined level by conveying a portion of the condensate to the combustion chamber of the said furnace.

9. A process for converting acid sludges containing carbonaceous material, sulfuric acid and sulfur compounds comprising the steps of: burning said acid sludges in a combustion chamber; conveying the combustion gases to a cooler where a part of the water vapor is condensed; electrostatically precipitating the sulfuric acid mist from the cooled combustion gases; mixing the condensate and precipitate to form a dilute acid liquor; and conveying a portion of said dilute acid liquor into the combustion chamber.

References Cited in the file of this patent

UNITED STATES PATENTS

| | | |
|---|---|---|
| 1,764,210 | Kimball | June 17, 1930 |
| 2,038,429 | Hechenbleikner | Apr. 21, 1936 |
| 2,155,200 | Merriam | Apr. 18, 1939 |
| 2,562,608 | Franklin | July 31, 1951 |